United States Patent [19]

Müller

[11] Patent Number: 4,909,774
[45] Date of Patent: Mar. 20, 1990

[54] DEVICE FOR ADJUSTMENT OF UNIVERSAL JOINT SHAFTS

[75] Inventor: Robert Müller, Mönsheim, Fed. Rep. of Germany

[73] Assignee: Porsche AG, Weissach, Fed. Rep. of Germany

[21] Appl. No.: 631,069

[22] Filed: Jul. 16, 1984

[30] Foreign Application Priority Data

Jul. 27, 1983 [DE] Fed. Rep. of Germany ....... 3326990

[51] Int. Cl.$^4$ .............................................. F16D 3/21
[52] U.S. Cl. ...................... 464/146; 464/906
[58] Field of Search ............... 403/326; 464/145, 146, 464/154, 156, 158, 906

[56] References Cited

U.S. PATENT DOCUMENTS

| | | | |
|---|---|---|---|
| 1,442,223 | 1/1923 | Knebusch | 403/326 |
| 3,017,755 | 1/1962 | Miller | 464/145 X |
| 3,204,429 | 9/1965 | Kayser | 464/906 X |
| 3,287,934 | 11/1966 | Asher | 464/146 |
| 3,688,521 | 9/1972 | Smith et al. | 464/146 |
| 3,822,570 | 7/1974 | Fisher | 464/146 |
| 4,261,668 | 4/1981 | Rigal | 403/326 X |
| 4,354,808 | 10/1982 | Ilg | 403/326 X |
| 4,385,899 | 5/1983 | Franklin, Jr. | 464/906 X |
| 4,511,346 | 4/1985 | Hazebrook et al. | 464/906 X |

FOREIGN PATENT DOCUMENTS

| | | |
|---|---|---|
| 2327566 | 1/1974 | Fed. Rep. of Germany ...... 403/326 |
| 914232 | 10/1946 | France ................. 464/156 |
| 82/01679 | 5/1982 | PCT Int'l Appl. . |
| 731887 | 6/1953 | United Kingdom . |
| 1185624 | 5/1966 | United Kingdom . |
| 1324178 | 11/1970 | United Kingdom . |

*Primary Examiner*—Daniel P. Stodola
*Attorney, Agent, or Firm*—Barnes & Thornburg

[57] ABSTRACT

A device for the adjustment of universal joint shafts, especially universal joint shafts for automotive vehicles. One of the shaft ends is coupled to a differential in a torque-transmitting fashion by a synchronizing slide joint and the other shaft end is coupled a universal joint hub which in turn is coupled to the wheel. A frictional coupling element with a defined retaining force is arranged between the shaft and the universal joint hub and couples the hub to the shaft in axially displaceable fashion.

20 Claims, 3 Drawing Sheets

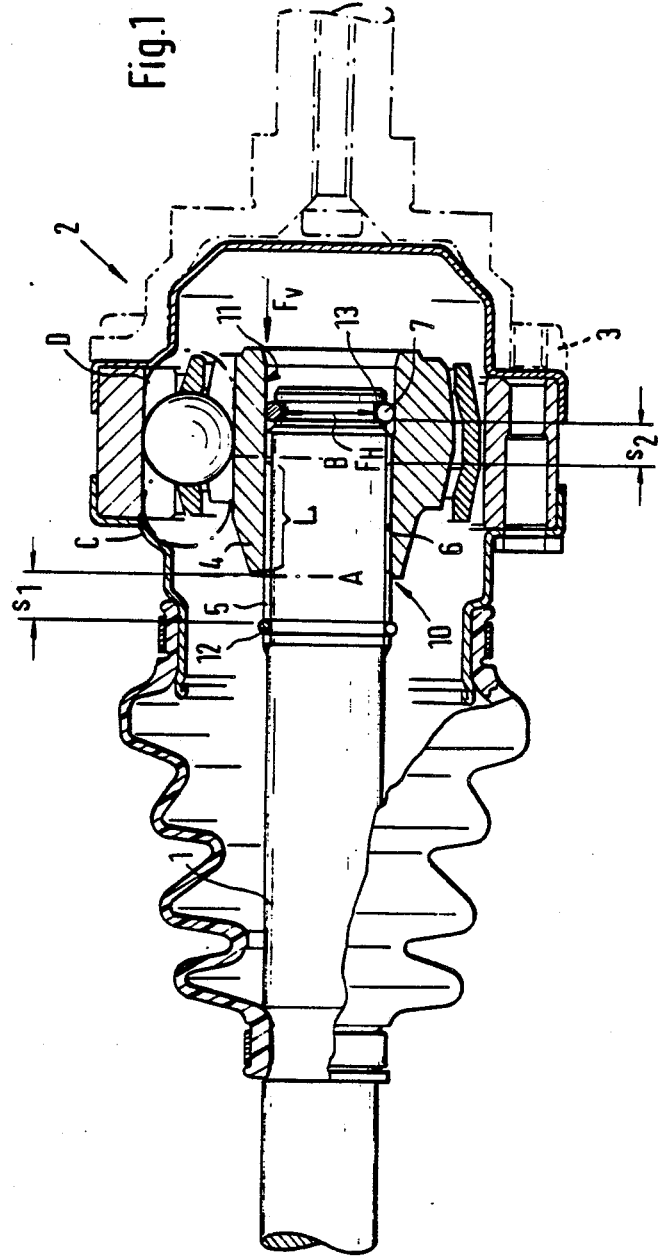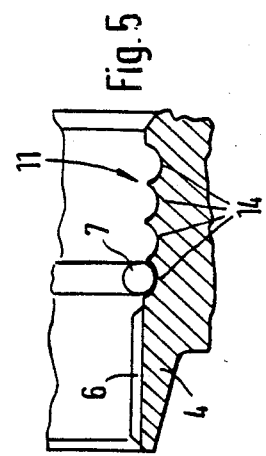

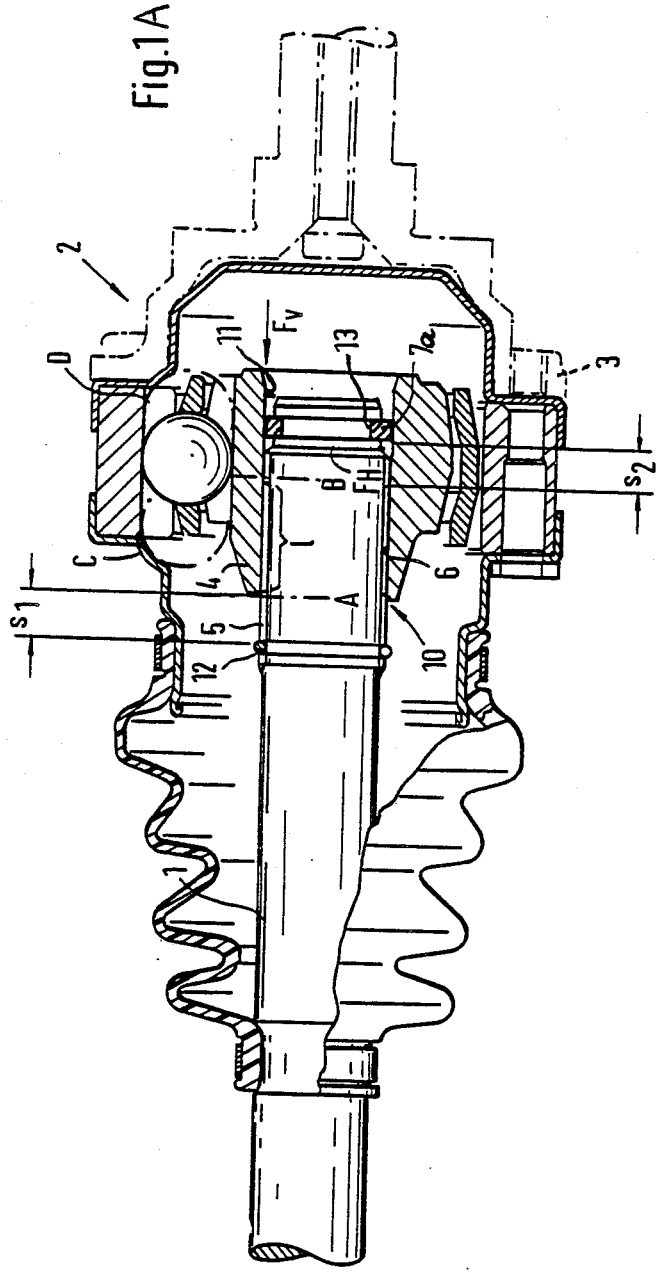

DEVICE FOR ADJUSTMENT OF UNIVERSAL JOINT SHAFTS

BACKGROUND AND SUMMARY OF THE INVENTION

The invention relates to a device for adjustment of universal joint shafts, such as the universal joint shafts of automobile drive trains.

For absorption of the position fluctuation of the universal joint shafts, determined by the axle kinematics of vehicles, as well as for compensation of construction tolerances, it is necessary to provide a torque-transmitting connection of the universal joint shafts with joints wherein a displacement of the universal joint shafts takes place. This connection can be arranged on the side of the differential and/or on the wheel side, depending on the drive mechanism (front-wheel, rear-wheel, four-wheel drive). In this connection, synchronizing slide joints are known which, by way of an appropriate cage, can absorb the displacement of the universal joint shaft and transverse movements of the unit. In extreme instances in which more extensive displacements of the universal joint shafts and related components, such as the differential, occur, the slide joints run against a stop, which is disadvantageous and leads to jamming and canting at the universal joint shaft as well as at the bearings.

In many cases, the displacement path is designed so short that displacements occurring additionally due to construction tolerances can no longer be compensated. However, expensive adaptation methods are known to provide adequate displacement capacity of the universal joint shaft and to ensure flawless functioning. In some such methods, the drive assembly is adjusted after construction in a cumbersome procedure. In other such methods the length of the universal joint shaft is adapted by means of spacer disks.

It is an object of the invention to provide a universal joint shaft which makes subsequent adjustment and adaptation unnecessary.

According to the invention, self-alignment of a universal joint with respect to its universal joint shaft axis takes place on account of a frictional coupling element inserted between hub and shaft. Additional manual readjustments of the joint and shaft are no longer required. Since the retaining force of the frictional coupling element is selected to be larger than the maximally occurring displacement force in the joint when the side joint is positioned between two end stops, a relative shifting of the shaft with respect to the hub is not possible after the universal joint shaft has been aligned, so that the operational displacements are absorbed exclusively in the joint. However, a displacement of the universal joint hub on the shaft is possible as soon as the joint is in abutting position.

On account of the arrangement of a frictional coupling element with a defined retaining force on the universal joint shaft, in accordance with this invention, neither the shaft nor the assembly needs to be adjusted during the building of a vehicle incorporating the universal joint. An automatic adjustment of the shaft, once it has taken place, remains preserved for future driving operation on account of the design of the retaining force.

Further objects, features, and advantages of the present invention will become more apparent from the following description when taken with the accompanying drawings which show, for purposes of illustration only, embodiments in accordance with the present invention.

BRIEF DESCRIPTION OF THE DRAWINGS

FIG. 1 is a schematical part sectional view showing a universal joint shaft with synchronizing slide joint and frictional coupling element constructed in accordance with a preferred embodiment of the present invention;

FIG. 1A is a schematic view similar to FIG. 1 showing a bushing used as the frictional coupling element;

FIG. 5 is a partial schematic sectional view which shows an arrangement of the supporting and sliding surface in the universal joint hub constructed in accordance with the present invention.

DETAILED DESCRIPTION OF THE DRAWINGS

Figure 2:
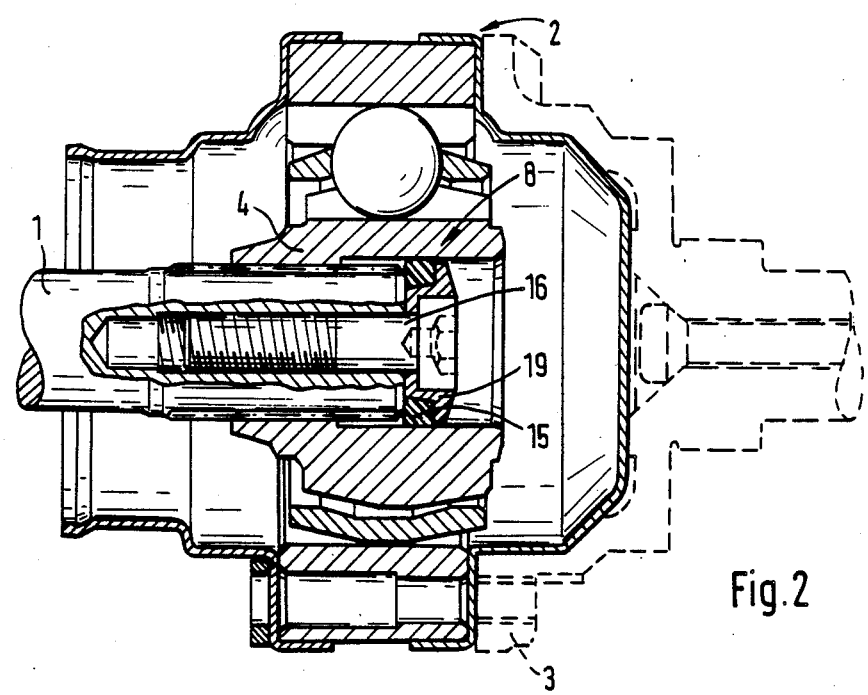
FIG. 2 is a schematic part-sectional view showing another embodiment of the frictional coupling element having a ring that can be tensioned.

A universal joint shaft 1 is connected at its end in a torque-transmitting fashion with a synchronizing slide joint 2. A connection to the differential is provided at the joint by way of a flange 3, the differential being arranged in or close to the longitudinal axis of symmetry of the vehicle. The end of the universal joint shaft 1 facing away from the joint 2 is retained in a further joint on the wheel side, this joint being designed as a fixed or displacement joint in correspondence with the concept of the vehicle.

A hub 4 of the joint 2 is connected in an axially displaceable fashion with the universal joint shaft 1 by means of a meshing connection 5, 6. Between the shaft 1 and the hub 4, a frictional coupling element 7; 8; 9 with a defined retaining force $F_H$ is arranged. This retaining force is larger than the maximally possible displacement force $F_V$ in the joint 2, when the joint is between the two end stops at C and D.

The serration 6 in the hub 4 extends in the inlet zone 10 of the shaft 1 over a partial length L. The subsequent zone of the hub 4 is designed as a supporting and sliding surface 11 for the frictional coupling element 7.

The serration 5 on the universal joint shaft 1 is defined by two stops. The stop on the end side is constituted by the frictional coupling element 7, and the further stop, arranged at a spacing corresponding to the length of the serration 5, is formed by a clamping ring 12 or the like. The stop 7 is arranged correspondingly at the end of the hub teeth 6 and the further stop is arranged correspondingly at the beginning of the hub teeth 6.

The stops 7 and 12 assume on the shaft 1 such a position in the central location of the shaft 1 and of the joint 2 that, for example, a forward displacement path $s_1$ and a rearward displacement path $s_2$ result. These paths are variable in accordance with the design. In particular, the forward displacement path $s_1$ may have only such a length that, upon abutment against the front end of the hub serration 6, the frictional coupling element 7 is still in contact with the supporting and sliding surface 11 of the hub 4.

The frictional coupling element 7 according to FIG. 1 is arranged in an annular groove 13 of the shaft 1, provided preferably at the shaft end. The frictional coupling element 7 is fashioned as a ring slotted all the way through, with a circular cross section, this ring being designed to be radially pretensioned and resilient.

The ring can also be a closed ring which in this case is held by an integral bead in the annular groove 13 or by way of a mounting element threadedly connected at the frontal side. In another embodiment, the frictional coupling element can also be fashioned as a bushing, 7a (see FIG. 1A).

The supporting and sliding surface 11 in the hub can also be provided with annular grooves 14 lying side-by-side, according to FIG. 5, the element 7 engaging these grooves in a shape-mating fashion upon displacement of the hub 4.

Pursuant to another embodiment of the invention according to FIG. 2, the frictional coupling element 8 is arranged on the end face of the universal joint shaft 1. The element comprises a clamping ring 15 pretensioned by means of a thrust washer 19—which is held at the shaft 1 by way of a mounting screw 16. The clamping ring 15 consists of a synthetic resin or some other pretensionable material, providing frictional coupling in correspondence with the required retaining force.

Figure 3:
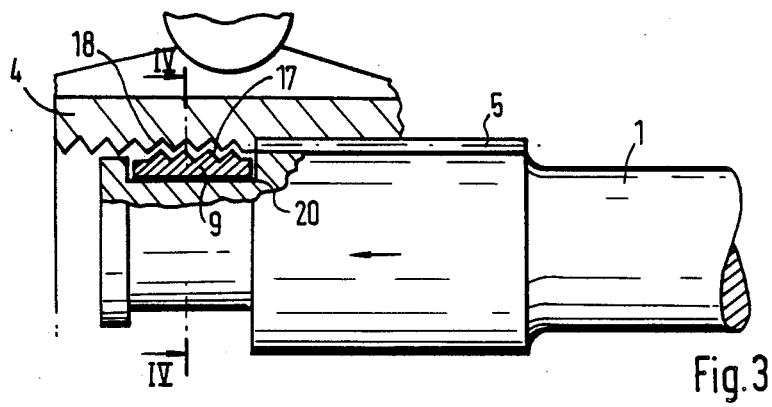
FIG. 3 is a schematic/art-sectional view showing a further embodiment of a frictional coupling element constructed in accordance with the present invention with a threaded ring.
Figure 4:
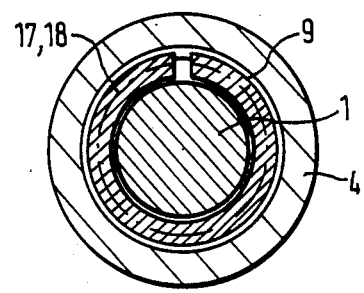
FIG. 4 is a sectional view taken along line IV—IV of FIG. 3.

Furthermore, another embodiment is included as illustrated in FIGS. 3 and 4, comprising a frictional coupling element 9 in the form of a radially resiliently pretensioned ring being slotted all the way through. This ring exhibits a thread 17 on its outer circumference, this thread meshing with an opposed thread 18 of the universal joint hub 4. This ring is held in a peripheral groove 20 of the universal joint shaft 1 provided at the end face.

As shown in greater detail in FIG. 1, the joint can be shifted for abutment in position C and position D. In these cases, the shaft 1 is displaced in the hub 4 with a corresponding displacement force $F_V$. The displacement ends once the stop 12 abuts the beginning of the hub serration 6 (position A) and, in the other displacement direction, once the frictional coupling element 7 abuts the end of the hub serration 6 (position B).

By a corresponding size of path $s_1$ and $s_2$, such a design can be attained that an adequate distance is available for compensating for the construction tolerances occurring as a whole.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A self-adjusting universal joint arrangement for drivingly joining a first and second part of a vehicle drive train, said arrangement comprising:
   first and second coupling means interconnecting said first and second parts,
   said first coupling means including means permitting a first range of relative axial displacement of said first and second parts in response to a first range of relative axial forces acting on said first and second parts,
   said second coupling means including means permitting a second range of relative axial displacement of said first and second parts in response to a second range of relative axial forces acting on said first and second parts,
   a universal joint hub means being interposed between said first and second parts for positioning said first coupling means between said hub means and said second part, and for positioning said second coupling means between said hub means and said first part, said first part comprising a universal joint shaft member,
   wherein a first and second stop means are arranged in a position central to said shaft member and said hub means for providing a predetermined range of forward and rearward axial displacement of said shaft member within said hub means,
   wherein said second coupling means includes a frictional coupling element means having a retaining force greater than said first range of relative axial forces,
   said second range of forces being of a greater magnitude than said first range of forces,
   said second coupling means thereby permitting additional relative displacement of said second part with respect to said first part when said second range of forces are acting on said parts.

2. A device according to claim 1, wherein the retaining force ($F_H$) of the frictional coupling element means exceeds the maximum possible displacement force ($F_V$) at the joint encountered in vehicle assembly, when said first coupling means is arranged in between two ends positions.

3. A device according to claim 2, wherein the frictional coupling element means permitting a second range of relative axial displacement of the universal joint shaft member and the universal joint hub means further includes a meshing connection means, wherein the meshing connection means includes a serration provided on the hub means and extending over a length thereof in an inlet zone of the shaft, a complementary serration provided in an adjacent region of the shaft, and a means providing a supporting and sliding surface for the frictional coupling element means in the hub means.

4. A device according to claim 3, wherein the said first stop includes a ring and said second stop includes said frictional coupling element means, said stops of said universal joint shaft member are located adjacent opposite ends of the hub means serration.

5. A device according to claim 4, wherein the first stop is positioned on the universal joint shaft member so that the frictional coupling element means is positioned within the hub means, regardless of the relative axial positions of the shaft member and hub means permitted by the stops.

6. A device according to claim 2, wherein the universal joint shaft member includes means defining an annular groove for positioning the frictional coupling element means.

7. A device according to claim 6, wherein the frictional coupling element means comprises a radially pretensioned, resilient ring with a circular cross section, the ring being slotted all the way through.

8. A device according to claim 6, wherein the frictional coupling element means comprises a bushing.

9. A device according to claim 1, wherein the frictional coupling element means permitting the second range of relative axial displacement of the universal joint shaft member and the universal joint hub means further includes a meshing connection means, the meshing connection means includes a serration provided on the hub and extending over a length thereof in an inlet zone of the shaft, a complementary serration provided in an adjacent region of the shaft, and a means providing a supporting and sliding surface for the frictional coupling element means in the hub means.

10. A device according to claim 9, wherein the said first stop includes a ring and said second stop includes said frictional coupling element means, said stops of said universal joint shaft member are located adjacent opposite ends of the hub means serration.

11. A device according to claim 10, wherein the first stop is positioned on the universal joint shaft member so that the frictional coupling element means is positioned within the hub means, regardless of the relative axial positions of the shaft member and hub means permitted by the stops.

12. A device according to claim 1, wherein the universal joint shaft member includes means defining an annular groove for positioning the frictional coupling element means.

13. A device according to claim 12, wherein the frictional coupling element means comprises a radially pretensioned, resilient ring with a circular cross section, the ring being slotted all the way through.

14. A device according to claim 12, wherein the frictional coupling element means comprises a bushing.

15. A device according to claim 1, wherein the frictional coupling element means comprises a radially pretensioned, resilient ring with a circular cross section, the ring being slotted all the way through.

16. A device according to claim 1, wherein the frictional coupling element means comprises a bushing.

17. A device according to claim 1, wherein a supporting and sliding surface in the hub means includes means defining annular grooves for engaging the frictional coupling element means, the annular grooves being arranged side-by-side.

18. A device according to claim 1, wherein the frictional coupling element means comprises a clamping ring, a thrust washer, and a screw for urging the thrust washer against the clamping ring to hold the clamping ring in a pretensioned condition against an end face of the universal joint shaft member.

19. A device according to claim 18, wherein the clamping ring is a synthetic resin clamping ring.

20. A device according to claim 1, wherein the frictional coupling element means comprises a ring with an outer thread, this ring being slotted all the way through and being radially resiliently pretensioned, an annular groove for holding the ring, the annular groove, provided on the universal joint shaft, and the universal joint hub means including an inner thread for engaging the outer thread, the inner and outer threads being complementarily shaped.

* * * * *